J. W. RUMMEL.
TOOL HANDLE.
APPLICATION FILED APR. 13, 1915.
1,153,340.
Patented Sept. 14, 1915.
2 SHEETS—SHEET 1.
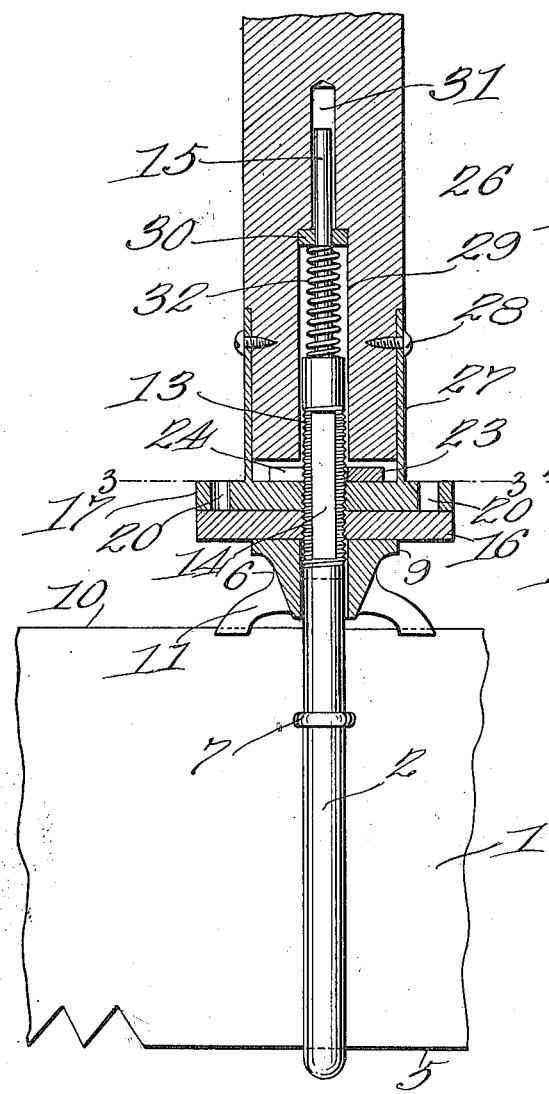
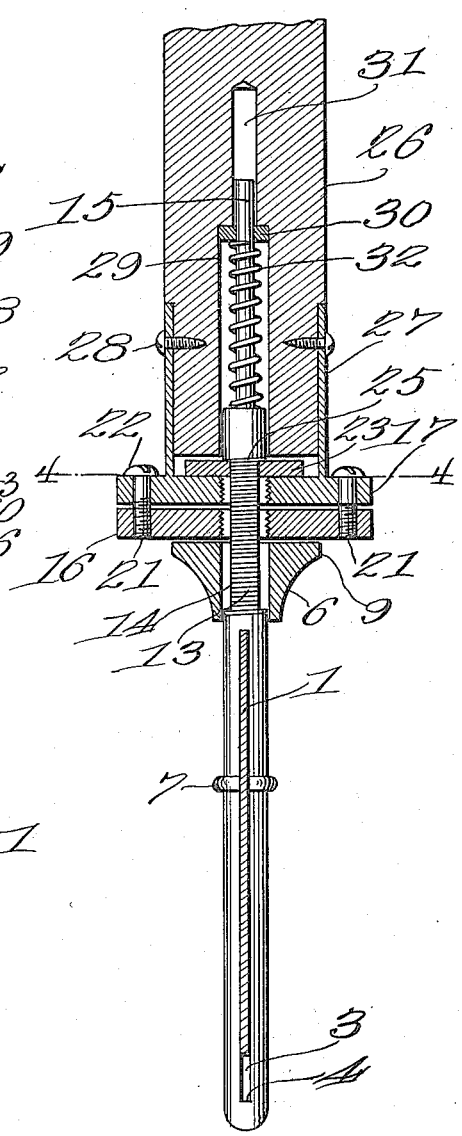
Witnesses
W. E. Mulligan
Thelma Crump
Inventor
James W. Rummel
By Carl D. Crawford
Attorney

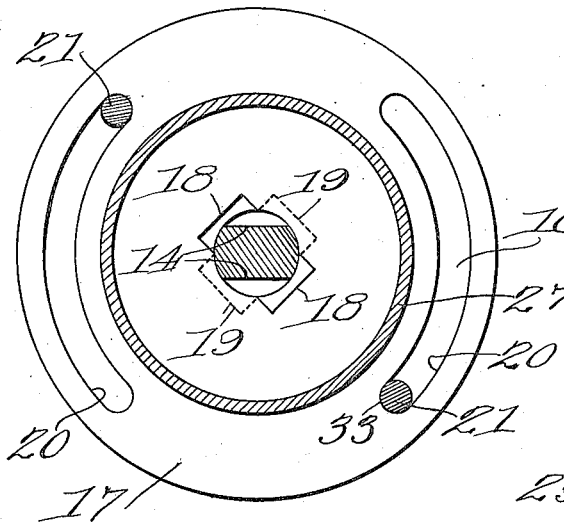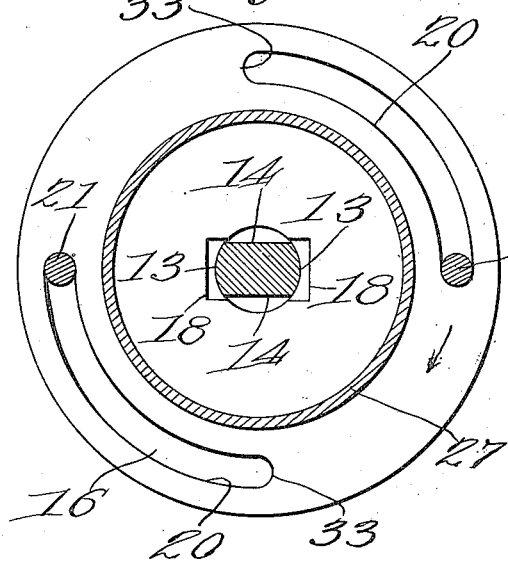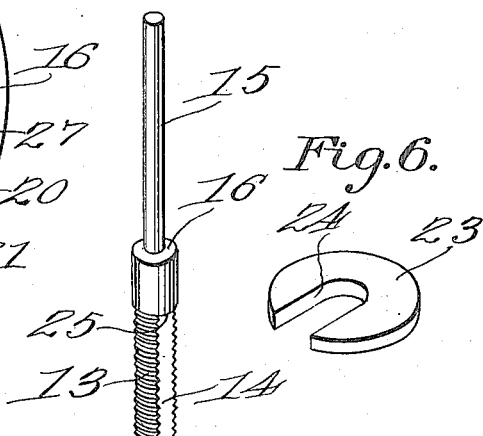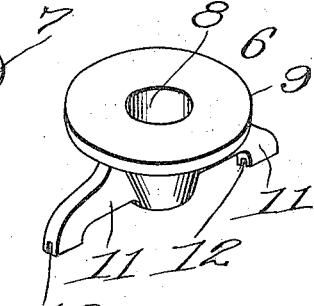

UNITED STATES PATENT OFFICE.

JAMES W. RUMMEL, OF WINDBER, PENNSYLVANIA.

TOOL-HANDLE.

1,153,340.  Specification of Letters Patent.  Patented Sept. 14, 1915.

Application filed April 13, 1915. Serial No. 21,102.

*To all whom it may concern:*

Be it known that I, JAMES W. RUMMEL, a citizen of the United States, a resident of Windber, in the county of Somerset and State of Pennsylvania, have invented certain new and useful Improvements in Tool-Handles, of which the following is a specification.

This invention relates to improvements in removable tool handles and has to do more particularly with an improved handle of this type which is especially adapted for removable attachment to a cross cut saw.

It is one of the objects of this invention to provide a removable handle structure which affords the most rigid and secure anchorage, when attached to the tool or saw, and which is capable, with a very slight manipulation, to be readily detached from the tool or saw.

My invention includes a tool or saw holder and a handle, nuts being provided for novel coaction between the handle and holder to either tightly grip the holder on the saw or quickly release the holder therefrom.

In the most improved embodiment, the holder is provided with a threaded portion which is mutilated or interrupted whereby it may be readily released from threaded engagement with the locking nuts for detachment from the saw.

A special novel feature of the invention consists in providing master and follower nuts operatively connected with each other by lost motion means thereby providing for relative movement, rotatively, of one nut with respect to the other, one of said nuts, preferably the master nut, being connected for operation by the handle.

My invention has many other objects and features which will be more fully described in connection with the accompanying drawings, and which will be more particularly pointed out in and by the appended claims.

In the drawings, Figure 1 is a vertical sectional view, with parts in elevation, showing my improved detachable handle applied to a cross cut saw, the latter being shown in side elevation. Fig. 2 is a sectional view looking from the right of Fig. 1, with parts in elevation, Fig. 3 is a sectional view on line 3—3 of Fig. 1, Fig. 4 is a sectional view on line 4—4 of Fig. 2, Fig. 5 is a perspective view of the tool holder shown detached, Fig. 6 is a perspective view of a retaining washer, Fig. 7 is a perspective view of a shoe.

Like characters of reference designate corresponding parts throughout the several figures of the drawings.

Describing my invention in the form of a detachable saw handle, 1 designates one end of a cross cut saw and 2 designates my improved holder stem. The holder stem is provided with a longitudinally extending slot 3 of a length exceeding the height of saws of a limited range of size for projection therethrough of one end of the saw so that the bottom 4 of the slot 3, can be brought into attaching engagement with the lower edge 5, of the saw 1, upon axial or lengthwise adjustment of the holder. The essential thing however, is to provide a holder which will nonrotatively engage the saw and which is axially shifted in the direction of its length to move said holder into an attaching position. A shoe 6 is loosely mounted on said holder and the latter is provided with a bead 7 to prevent the shoe from descending downwardly off from the holder when the latter is detached from the saw. The shoe 6 is provided with a bore 8, for projection therethrough of the holder stem or spindle and an engaging or nut gripping flange 9 is formed at the top of said shoe. In order to provide for engagement of the shoe with the upper edge 10 of the saw 1, in opposition to the engagement against the lower edge 5 by the slot end 4, I provide the shoe 6 with oppositely extending feet 11 and provide the terminals of the feet with grooves 12, the latter taking over or seating upon the upper edge 10 to provide points of engagement laterally of the holder 2.

Now it will be readily seen that when the holder 2 is adjusted upwardly in the direction of its length, and for clearness of description, if the shoe is adjusted downwardly, the saw will be gripped in such a manner as to prevent shifting movement of the holder with respect to the saw without necessitating the provision of notches in the edge of the saw, either above or below.

The holder 2 is provided with a reduced threaded length or section 13 and said section 13 is reduced, preferably on opposite sides or at opposite points, as indicated at 14, to provide releasing portions, the function of which will presently appear. The holder 2 is reduced to provide an upper guiding section 15 and the resulting shoulder 16 forms an abutment, for a spring which will presently be described.

A follower nut is designated at 16 and a master nut is indicated at 17 and said nuts are disposed in superposed relation about the threaded section 13 and above the shoe 6. The bores of said nuts are shown threaded for threaded engagement with the section 13 and said bores are provided with offset release ways or portions which are shown in the form of enlargements. Thus the master nut 17 is provided with oppositely disposed release ways 18 and the follower nut is provided with oppositely disposed release ways 19. The master and follower nuts are connected by a novel rotatively lost motion means whereby the master nut 17 may be adjusted in either of two rotative directions to a preliminary extent before it actuates the follower nut.

As illustrated, the master nut is provided with segmental slots 20 which are proportioned as quadrants, the distance between the adjacent ends of said slots being equal to either of said slots. Pins 21, preferably in the form of screws, are threaded into the follower nut 16 and extend through the slots 20 and are provided with heads 22 for limiting movement of the nuts away from each other. The construction shown provides for movement of said nuts apart from each other to only the limited extent shown in Fig. 2.

A retaining washer 23 is interposed between the master nut 17 and the holder 2 in such a manner as to prevent total disconnection therebetween. I have shown the washer 23 provided with a slot 24 which is equal in width to the reduced or lesser cross section of threaded section 13 so that the walls of said slot 24 will engage the opposed mutilated or flat faces 14. The shoulder 25 resulting from the reduction at 14, will engage the washer 23 and prevent the holder from moving downwardly completely out of engagement with the nuts.

The master nut 17 is operatively associated with a handle 26 in such a manner as to be actuated thereby and I preferably provide the nut 17 with a sleeve 27 into which the handle 26 telescopes and with which the handle 26 is connected by means such as screws 28. It will be understood that the washer 23 will be inserted in position before the handle 26 is attached when the parts are initially assembled. The handle 26 is provided with a relatively enlarged bore 29, for receiving the threaded section 13 with a loose working clearance. A metal guiding bearing 30 is fixed in the handle 26 and is bored to receive the reduced guiding section 15, of the holder 2.

Above the guiding bearing 30, the bore in the handle 26 is reduced, as indicated at 31. A releasing spring 32 is interposed between the shoulder 16 and the guiding bearing 13 and said spring is an expansively acting spring which normally acts to shift the holder to longitudinally out of an attaching position.

Immediately after the holder 2 is slipped over the end of saw 1, as shown in Fig. 2, the handle 26 will be elevated so that the shoe 6 will be free to be positioned on the top edge 10. The holder 2 occupies a downward or releasing position because of the action of spring 32 and the nuts are in the position shown in Fig. 4, with their release spaces 18 and 19 in registry abreast of the threaded portions of section 13 so as to permit free longitudinal movement of the holder 2 with respect to the handle 26. The holder 2 will next be forced upwardly, by applying pressure to the lower end thereof to engage the end 4, of slot 3, with the lower edge 5, of the saw 1. This will compress spring 32 and the handle 26 will be revolved to first engage the threads of nut 17 with the threaded section 13. Nut 17 will be revolved a quarter turn before the ends 33, of slots 20 will engage pins 21. This will take up any loose play between the nuts and at the conclusion of this preliminary movement the follower nut 16 will be revolved by means of the thrust applied to pins 21. The nuts will thereafter rotate, as one nut, and be extreme pitch of the threads of 13 and the nuts will impart a sufficient degree of upward movement to the holder 2 and downward movement to the shoe 6 as to lock the device firmly upon the saw. By reason of the fact that the release ways are out of registry as shown in Fig. 3, there will always be some portion of the threaded bores of the nuts in engagement with threaded section 13. Thus because of the preliminary shifting movement of the holder 2, it will only take a slight rotary adjustment to firmly grip the device upon the saw. In detaching the device, rotation of the handle 26, opposite to the arrow of Fig. 4, will bring the release ways 18 and 19 into registry, as shown in Fig. 4, so that the spring 32 will be free to shift the holder downwardly, as shown in Fig. 2, to release the saw.

It is believed that the advantages and utility of my invention will be clearly understood from the foregoing description, and while I have herein shown one specific form of my invention for attachment to a cross cut saw, it will be understood that the term saw is used to define a tool, broadly except in the more specific claims, and I will therefore consider that my invention is not limited to the specific disclosure except for such limitations as the claims may import.

I claim:—

1. In a detachable handle for cross cut saws, a saw holder provided with an elongated slot for receiving one end of the saw and having a threaded section provided with opposed releasing sides, a shoe loosely fitting said holder for coaction with the latter to hold the saw, loosely connected master and follower nuts having threaded engagement with the threaded section of said holder and having release ways for releasing said holder for free longitudinal movement through said nuts, and a handle connected with one of said nuts to operate both thereof for tightening or releasing said holder, substantially as described.

2. In a detachable handle for cross cut saws, a saw holder for engagement with said saw and provided with a threaded section having opposed releasing portions, a shoe for coaction with said holder to grip the saw, master and follower nuts having threaded engagement with said threaded section and provided with release ways for releasing said holder, and a handle operatively connected with said nuts for effecting relative movement of said shoe and holder to grip said saw, substantially as described.

3. In a detachable handle for cross cut saws, a holder for engagement with the saw and provided with a threaded section having opposed releasing portions, a shoe for coaction with said holder to grip the saw, master and follower nuts having threaded engagement with said threaded section and provided with release ways for releasing said holder, means loosely connecting said nuts for relative rotary movement of one with respect to the other to a predetermined extent, and a handle operatively connected with one of said nuts for actuating both thereof to effect relative movement of said shoe and holder to grip the saw or to release the holder and shoe from the saw, substantially as described.

4. In a detachable handle for tool bodies, a holding device for gripping or engaging the tool body and having a threaded section provided with a releasing portion, nuts loosely connected with each other for coaction with said threaded section and having release ways for coaction with said releasing portion to release said holding device, and a handle connected with one of said nuts to actuate the latter consecutively to shift the holding device into a gripping position or to release said holding device from a gripping position, substantially as described.

5. In a detachable handle structure for tool bodies, a holding device for engagement with the tool body and having a threaded section provided with a releasing portion, and threaded mechanism for coaction with said threaded section to engage said holding device with said tool body and provided with a releasing portion for coaction with the releasing portion of said section to release said holding device, substantially as described.

In testimony whereof I affix my signature.

JAMES W. RUMMEL.

Copies of this patent may be obtained for five cents each, by addressing the "Commissioner of Patents, Washington, D. C."